(Model.)
J. E. PORTER.
HAY FORK.
No. 269,230. Patented Dec. 19, 1882.
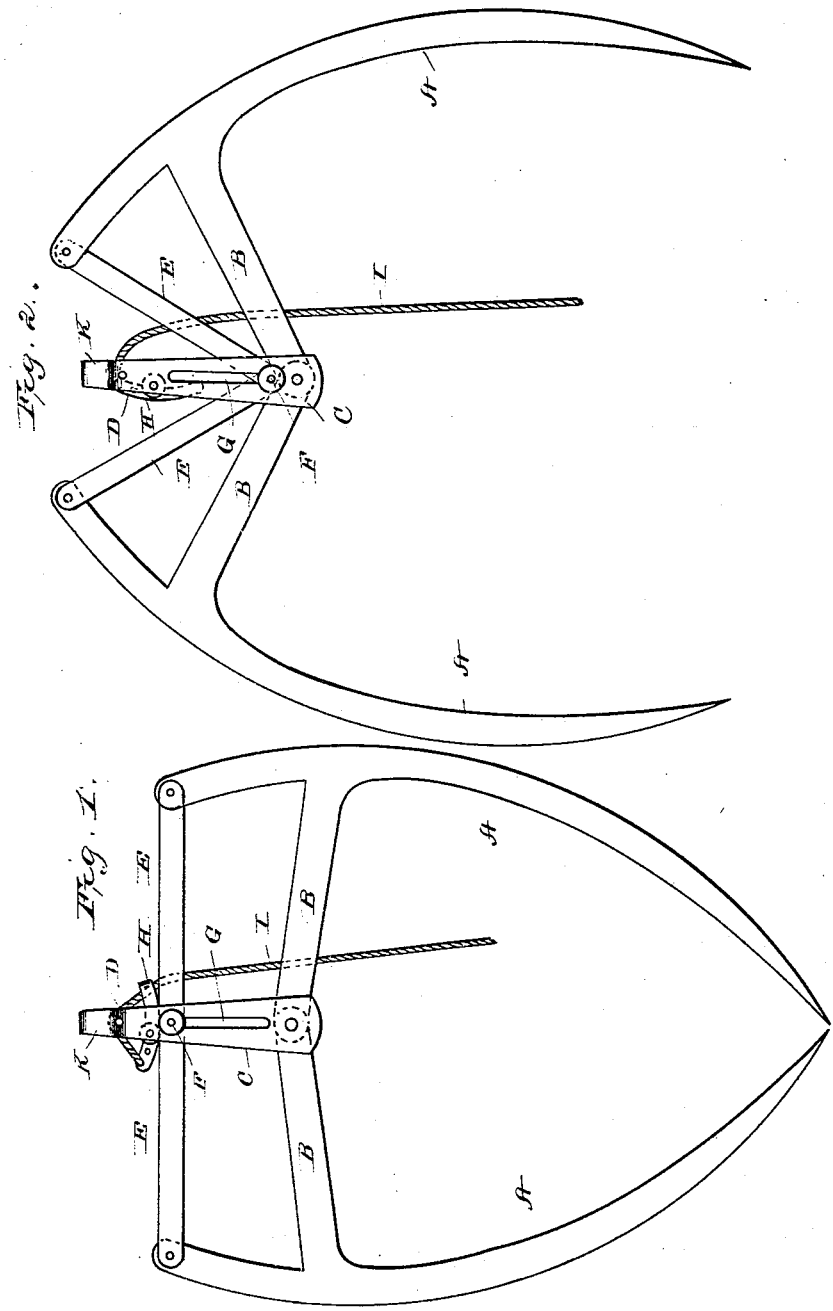
Witnesses.
Edwin L. Yewell.
H. Aubrey Toulmin
Inventor,
Joseph E. Porter.
By E. M. Alexander,
Attorney.

UNITED STATES PATENT OFFICE.

JOSEPH E. PORTER, OF OTTAWA, ILLINOIS.

HAY-FORK.

SPECIFICATION forming part of Letters Patent No. 269,230, dated December 19, 1882.

Application filed March 23, 1882. (Model.)

*To all whom it may concern:*

Be it known that I, JOSEPH E. PORTER, of Ottawa, in the county of La Salle, and in the State of Illinois, have invented certain new and useful Improvements in Hay-Forks; and I do hereby declare that the following is a full, clear, and exact description thereof, reference being had to the accompanying drawings, and to the letters of reference marked thereon, making a part of this specification.

This invention relates to certain improvements in that class of horse hay-forks having swinging tines which are automatically operated by the insertion of the same into the hay to secure a load and lock the tines; and it has for its object to provide an improved locking and tripping device for such forks, as more fully hereinafter specified. These objects I attain by the means illustrated in the accompanying drawings, in which—

Figure 1 represents a side elevation of my improved fork, showing the tines closed and the parts locked; and Fig. 2 represents an elevation showing the tines opened to drop the hay.

The letter A indicates the tines of the fork, which are curved inwardly and provided with arms B, which are pivoted between the cheeks C of a central connection, D, so as to permit the tines to swing freely to and from each other. The tines at their upper ends are connected to the outer ends of toggle-levers, E, the inner ends of which are loosely connected by means of a bolt, F, which passes through the vertical slots G in the cheeks of the central connecting-piece, in which said bolt or rivet is adapted to travel vertically as the tines are opened or closed, the inner ends of the lever being adapted to travel vertically between the cheeks of the connection.

The letter H indicates a trip-lever or dog pivoted between the upper part of the cheeks, just above the termination of the slots at their upper ends, in such position that when the levers are in a horizontal line, or in a position slightly above a horizontal line, the said lever or dog will rest across the connected inner ends of the toggle-levers, the position which the parts of the lever assume to lock the tines. The lever or dog has connected to one end a trip-rope, I, which passes through an eye, K, in the central connection and serves as a means by which the toggle-levers may be tripped.

The operation of my invention is as follows: The fork is suspended from the elevating rope or chain of the carrier in the usual manner, and when forced into a body of hay the shape of the tines will cause them to approach each other and close upon the hay, so as to secure the load. When the lower ends have met the toggle-levers will assume a horizontal position, or a position slightly above a horizontal line, the lever or pawl being turned down so as to rest across their connected ends. In this position the tines will be securely locked, as the levers bear against each other in a direct line, or at an angle above a horizontal line. When desired to unload the hay, the trip-lever is drawn into a vertical position, bearing against the toggle-levers and throwing them below a horizontal line, permitting the weight of the load to force the tines apart and drop said load.

Having thus described my invention, what I claim, and desire to secure by Letters Patent, is—

The combination of the curved tines A, the arms B, and extensions above these arms, the cheeks C, having the arms B, pivoted to their lower ends, the central connection, D, toggle-levers E, pivot-bolt F, movable in slots G in said cheeks, the trip-lever H, pivoted to the cheeks, and an eye, K, on the upper part of the latter, all arranged and operating substantially in the manner described.

In testimony whereof I affix my signature, in presence of two witnesses, this 8th day of March, 1882.

JOSEPH E. PORTER.

Witnesses:
  F. M. YENTZER,
  J. A. HOSSACK.